United States Patent
Della Flora et al.

(10) Patent No.: US 10,461,679 B2
(45) Date of Patent: Oct. 29, 2019

(54) MOTOR CONTROL SYSTEM AND METHOD

(71) Applicant: Danfoss Power Electronics A/S, Grasten (DK)

(72) Inventors: Leandro Della Flora, Cary, NC (US); Anton Smith, Rockford, IL (US)

(73) Assignee: Danfoss Power Electronics A/S, Grästen (DK)

( * ) Notice: Subject to any disclaimer, the term of this patent is extended or adjusted under 35 U.S.C. 154(b) by 0 days.

(21) Appl. No.: 16/064,502

(22) PCT Filed: Jan. 4, 2017

(86) PCT No.: PCT/EP2017/050161
§ 371 (c)(1),
(2) Date: Jun. 21, 2018

(87) PCT Pub. No.: WO2017/118669
PCT Pub. Date: Jul. 13, 2017

(65) Prior Publication Data
US 2019/0006974 A1   Jan. 3, 2019

Related U.S. Application Data
(60) Provisional application No. 62/275,872, filed on Jan. 7, 2016.

(51) Int. Cl.
*H02P 21/18* (2016.01)
*H02P 6/20* (2016.01)
(Continued)

(52) U.S. Cl.
CPC ........... *H02P 21/18* (2016.02); *H02P 6/20* (2013.01); *H02P 21/22* (2016.02); *H02P 27/12* (2013.01)

(58) Field of Classification Search
CPC .................. H02P 21/18; H02P 27/12
(Continued)

(56) References Cited

U.S. PATENT DOCUMENTS 5,969,496 A    10/1999   Yamada et al.
7,859,205 B2 * 12/2010   Mori ................... H02P 3/22
                                                        318/379

FOREIGN PATENT DOCUMENTS

EP      0994561 A2    4/2000
EP      1195611 A1    4/2002
(Continued)

OTHER PUBLICATIONS

International Search Report for PCT Serial No. PCT/EP2017/050161 dated Mar. 24, 2017.

*Primary Examiner* — David Luo
(74) *Attorney, Agent, or Firm* — McCormick, Paulding & Huber LLP

(57) ABSTRACT

A method and apparatus for catching a rotating motor is described. Switches (typically the lower switches) of an inverter of a motor drive circuit are short-circuited for a brief period of time. The pulses generated by this process are analyzed to determine the speed and direction of rotation of the motor. The pulses are checked to determine whether they are orthogonal. If they are, the motor velocity determination is deemed to be reliable and then motor is magnetized and normal motor control can be resumed. If not, the motor velocity determination is deemed to be unreliable and a magnetization pulse before the velocity determination step is repeated.

20 Claims, 7 Drawing Sheets

(51) Int. Cl.
*H02P 21/22* (2016.01)
*H02P 27/12* (2006.01)

(58) Field of Classification Search
USPC ............................. 318/400.02, 400.01, 700
See application file for complete search history.

(56) References Cited

FOREIGN PATENT DOCUMENTS

| | | |
|---|---|---|
| JP | 2007252042 A | 9/2007 |
| WO | 2012/136211 A2 | 10/2012 |

* cited by examiner

MOTOR CONTROL SYSTEM AND METHOD

CROSS-REFERENCE TO RELATED APPLICATIONS

This application is a National Stage application of International Patent Application No. PCT/EP2017/050161, filed on Jan. 4, 2017, which claims priority to U.S. Patent Application No. 62/275,872, filed on Jan. 7, 2016, each of which is hereby incorporated by reference in its entirety.

TECHNICAL FIELD

The present invention relates to a motor control system and method.

BACKGROUND

Adjustable speed drives are known for use in the control of multi-phase electric motors. In some cases, the state of an electric motor being driven by an adjustable speed drive may be unknown. Specifically, the angular position and/or the speed of rotation of a rotor of the motor may be unknown. This can happen for many different reasons. Such a situation can occur, for example, following a short power outage. Alternatively, this situation can arrive when a rotor is already spinning before motor drive control has commenced (i.e. on startup of the motor drive).

Thus, a motor may have both mechanical and electrical energy stored therein before being under the control of a motor drive. Algorithms are known that seek to enable a motor drive to take control of a motor without creating a large disturbance in the energy stored in the machine and to do so without taking all the energy out of the motor. However, there remains a need for improved and alternative motor control systems and methods.

The present invention seeks to provide an alternative method to those already available.

SUMMARY

The present invention provides a method (of catching or controlling a motor) comprising: estimating a frequency of rotation of a motor (i.e. motor speed) by repeatedly short-circuiting at least some windings of the motor in order to generate a plurality of short circuit current pulses, identifying the peaks of the short circuit current pulses and using the identified peaks to estimate said frequency (and typically also direction) of rotation; determining whether the estimation of the frequency of rotation of the motor is reliable; and in the event that the estimation of the frequency of rotation of the motor is determined to be unreliable, applying a magnetising pulse to the motor and repeating the steps of estimating the frequency of rotation of the motor and determining whether the estimation of the frequency of rotation of the motor is reliable.

The present invention further provides a controller (e.g. a motor controller/flystart module) comprising: a first input for receiving a plurality of short-circuit current pulses from at least some windings of the a motor; a control module configured to identify peaks of the short circuit current pulses and using the identified peaks to estimate said frequency (and typically also direction) of rotation of the motor, the control module further configured to: determine whether the estimation of the frequency of rotation of the motor is reliable; and in the event that the estimation of the frequency of rotation of the motor is determined to be unreliable, to instruct the application of a magnetizing pulse to the motor and to repeat the steps of estimating the frequency of rotation of the motor and determining whether the estimation of the frequency of rotation of the motor is reliable. The controller may further comprise a frequency estimator (e.g. incorporating a phase locked loop) configured to generate the estimate of the frequency (and direction) of rotation of the motor. The frequency estimator may be further configured to determine whether signals indicative of cosine and sine vectors of measured currents are orthogonal.

Determining whether the estimation of the frequency of rotation of the motor is reliable may comprise determining whether signals indicative of cosine and sine vectors of measured currents are orthogonal. More specifically, determining whether the signals indicative of the cosine and sine vectors are orthogonal may include determining whether a dot product of the cosine and sine vectors is below a threshold (e.g. close to zero). In one form of the invention, the cosine and sine vectors are the Clarke's transform of the peaks of the short circuit current pulses.

The invention may further comprise determining that the motor is at standstill in the event that repeating the step of determining whether the estimation of the frequency of rotation of the motor is reliable results in a determination that the frequency of rotation of the motor estimate is still unreliable.

In some forms of the invention, applying a magnetising pulse to the motor comprises injecting a ramping multi-phase (typically 3-phase) current into the motor (typically at a predetermined rate). This is typically done until the rated current of the machine is reached. A current regulator may be used to generate the magnetization pulse.

Some forms of the invention include increasing the magnetizing level within the motor (and then exiting the method), if the estimation of the frequency of rotation of the motor is determined to be reliable. The step of increasing the magnetizing level within the motor may comprise injecting a multi-phase (typically three phase) current into the motor (e.g. until the motor is fully magnetised).

The present invention yet further provides a motor drive circuit comprising a controller as set out above and further comprising an inverter under the control of said controller.

BRIEF DESCRIPTION OF THE DRAWINGS

The invention will now be described in further detail with reference to the following schematic drawings, in which.

DETAILED DESCRIPTION

Figure 1:
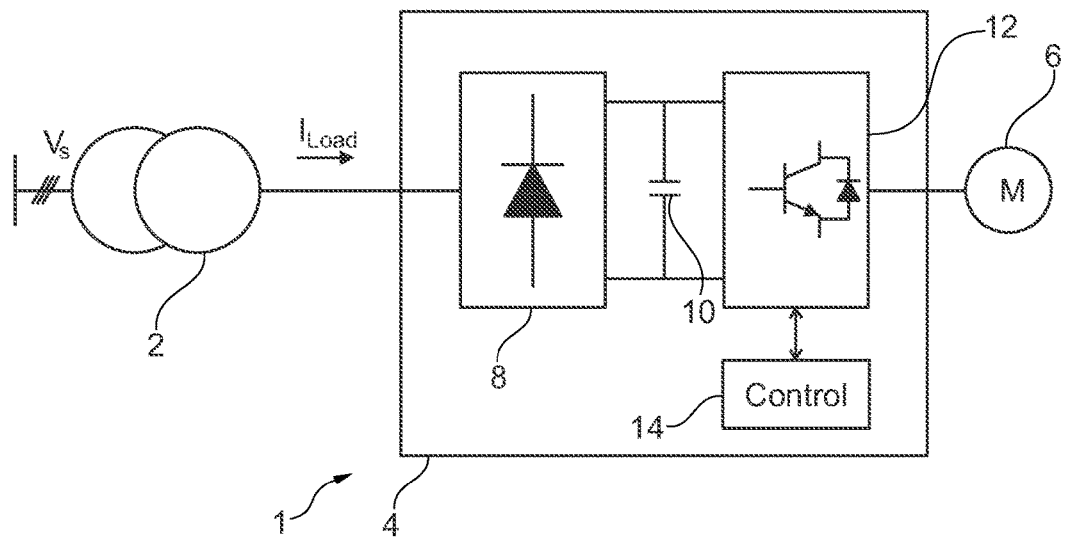
FIG. 1 shows a multi-phase motor drive system.

FIG. 1 is a block diagram of a system, indicated generally by the reference numeral 1, including an adjustable speed drive (ASD). The system 1 comprises an AC power supply 2, an ASD 4 and a load 6 (such as a three-phase motor). The ASD 4 includes a rectifier 8 (often a diode-based rectifier, as shown in FIG. 1, although alternatives, such as advanced front end rectifiers are known), a DC link capacitor 10, an inverter 12 and a control module 14.

The output of the AC power source 2 is connected to the input of the rectifier 8. The output of the rectifier 8 provides DC power to the inverter 12. As described further below, the inverter 12 includes a switching module used to convert the DC voltage into an AC voltage having a frequency and phase dependent on gate control signals. The gate control signals are typically provided by the control module 14. In this way, the frequency and phase of each input to the load 6 can be controlled.

The inverter 12 is typically in two-way communication with the control module 14. The inverter 12 may monitor currents and voltages in each of the three connections to the load 6 (assuming a three-phase load is being driven) and may provide current and voltage data to the control module 14 (although the use of both current and voltage sensors is by no means essential). The control module 14 may make use of the current and/or voltage data (where available) when generating the gate control signals required to operate the load as desired; another arrangement is to estimate the currents from the drawn voltages and the switching patterns—other control arrangements also exist.

Figure 2:
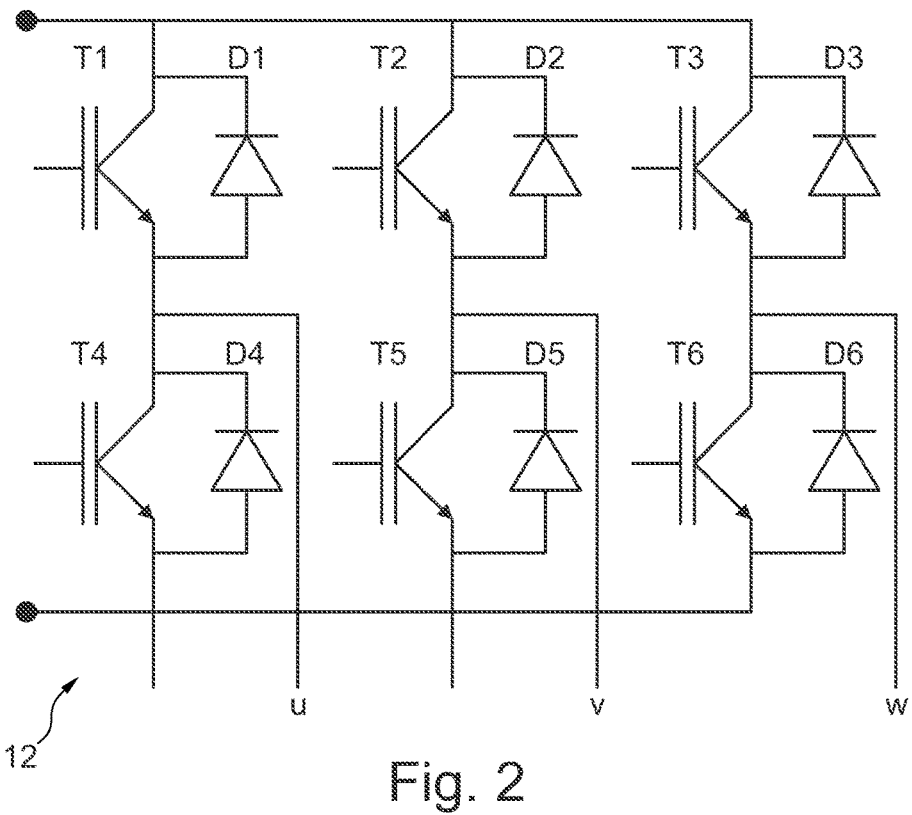
FIG. 2 shows an inverter that may be used in the motor drive system of FIG. 1.

FIG. 2 shows details of an exemplary implementation of the inverter 12.

As shown in FIG. 2, the inverter 12 comprises first, second and third high-sided switching elements (T1, T2 and T3) and first, second and third low-sided switching elements (T4, T5 and T6). Each switching element may, for example, be an insulated-gate bipolar transistor (IGBT) or a MOSFET transistor. As shown in FIG. 2, each of the switching elements (T1 to T6) is associated with a corresponding free-wheeling diode (D1 to D6).

The exemplary inverter 12 is a three-phase inverter generating three outputs: U, V and W. The three phases of the inverter 12 provide inputs to the three-phases of the load 6 in the system 1 described above. Of course, the inverter 12 could be modified to provide a different number of outputs in order to drive a different load (such as a load with more or fewer than three phases).

The first high-sided switching element T1 and the first low-sided switching element T4 are connected together between the positive and negative DC terminals. The mid-point of those switching elements provides the U-phase output. In a similar manner, the second high-sided switching element T2 and the second low-sided switching element T5 are connected together between the positive and negative DC terminals with the mid-point of those switching elements providing the V-phase output. Furthermore, the third high-sided switching element T3 and the third low-sided switching element T6 are connected together between the positive and negative DC terminals with the mid-point of those switching elements providing the W-phase output.

The inverter 12 is a 2-level, 6 transistor inverter. As will be apparent to those skilled in the art, the principles of the present invention are applicable to different inverters, such as 3-level inverters. The description of the inverter 12 is provided by way of example to help illustrate the principles of the present invention.

Figure 3:
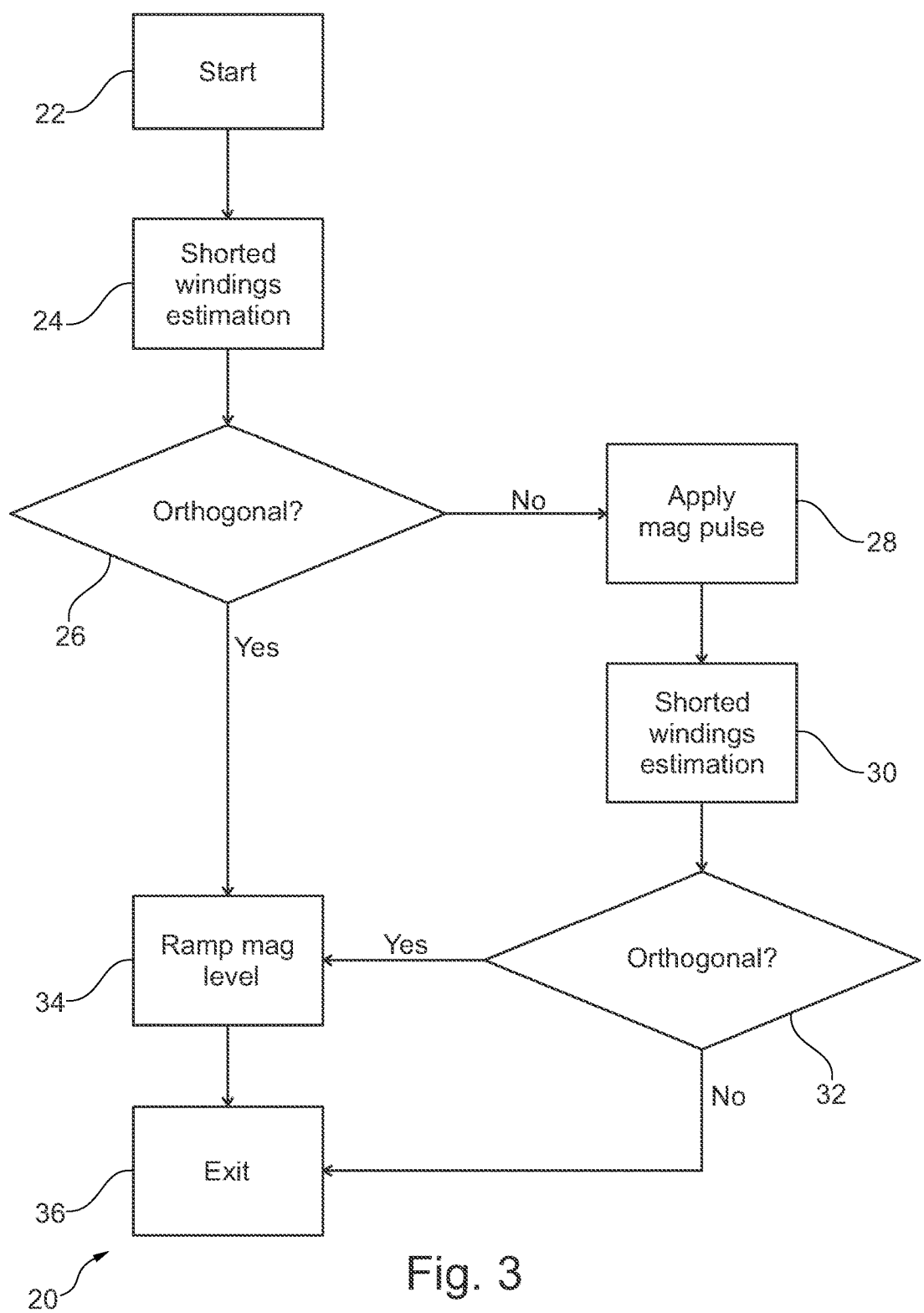
FIG. 3 is a flow chart of an algorithm in accordance with an aspect of the present invention.

FIG. 3 is a flow chart of an algorithm, indicated generally by the reference numeral 20, in accordance with an aspect of the present invention.

The algorithm 20 starts at step 22, during which step, initialization and calibration may occur, if required. The algorithm then moves to shorted windings estimation step (step 24).

At step 24, a number of switches of the inverter 12 are closed for a brief period of time in order to generate short-circuit pulses. In one form of the invention, each of the low-side switching elements (T4, T5 and T6 in the exemplary inverter 12) is closed periodically. In general, the short-circuiting must be long enough to get a measurable current that can be used later in the algorithm, but short enough to keep the inverter in a discontinuous mode of operation.

Figure 4:
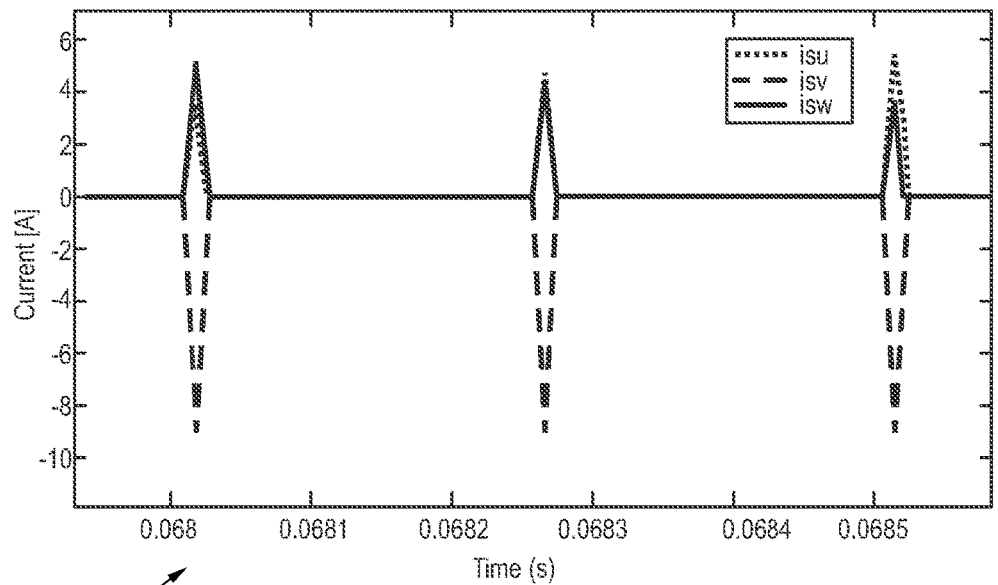
FIG. 4 shows current waveforms on motor windings in accordance with an aspect of the present invention.

FIG. 4 is a graph, indicated generally by the reference numeral 40, showing current waveforms on motor windings in response to the short circuiting of the low-side switching elements as described above. FIG. 4 shows three pulses and the 3 phase current waveform looks like a set of sawtooth waveforms whose envelope is 3 phase sinusoidal.

Figure 5:
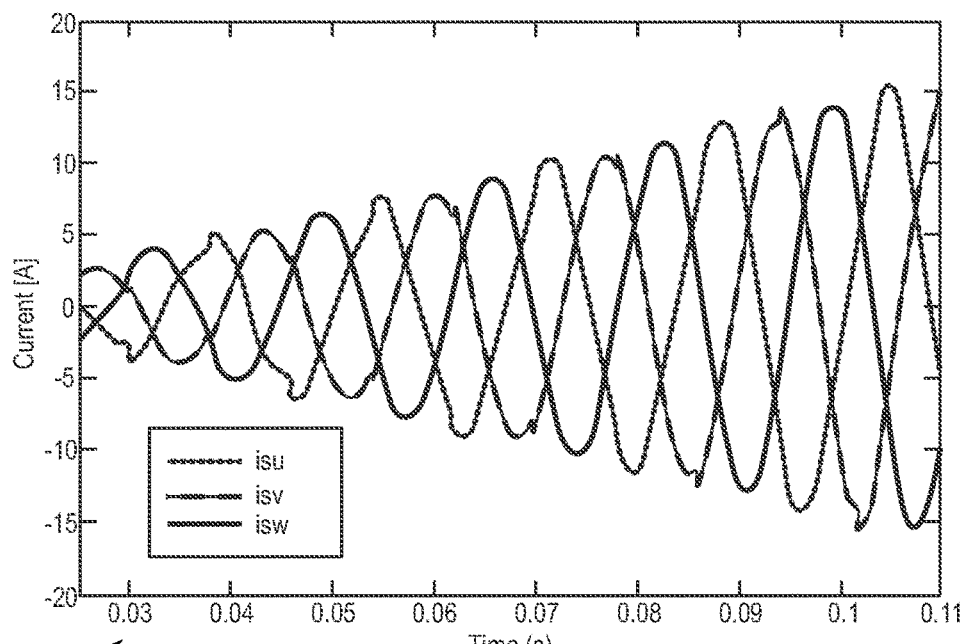
FIG. 5 shows envelopes of current waveforms in accordance with an aspect of the present invention.

Taking the peaks of the sawtooth waveform allows for the envelope to be separated and used for frequency estimation. FIG. 5 shows envelopes (indicated generally by the reference numeral 50) of current waveforms in accordance with an aspect of the present invention. The sawtooth waveforms visible in FIG. 4 can be filtered out by sampling the short-circuit currents when the switches are open, thus obtaining the peak of the sawtooth waveform.

Figure 6:
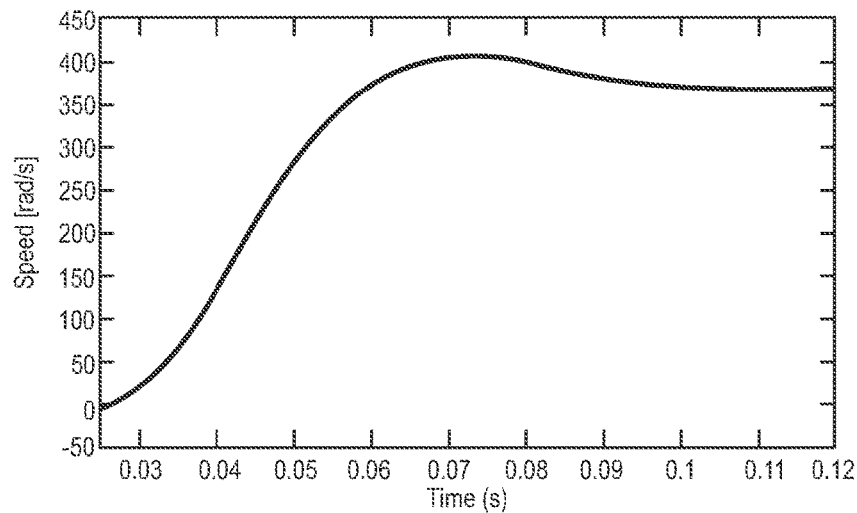
FIG. 6 shows estimated frequency over time in accordance with an aspect of the present invention.

The frequencies of the envelopes shown in FIG. 5 indicate the frequency of rotation of the respective phases of the motor 6. FIG. 6 is a graph, indicated generally by the reference numeral 60, showing estimated frequency over time in accordance with an aspect of the present invention. The frequency estimation is based on the envelopes shown in FIG. 5 and corresponds to the frequency of rotation of the motor 6. In the example of FIG. 6, the frequency estimate settles at about 325 radians/second.

At this stage, the shorted windings estimation step 24 of the algorithm 20 has been used to obtain an estimate of the speed of rotation of the motor.

As noted above, the frequencies of rotation of the envelopes shown in FIG. 5 are equal to the electrical frequency rotation of the motor. The envelopes are used as the input of a Phase Lock and Loop, PLL.

Figure 7:
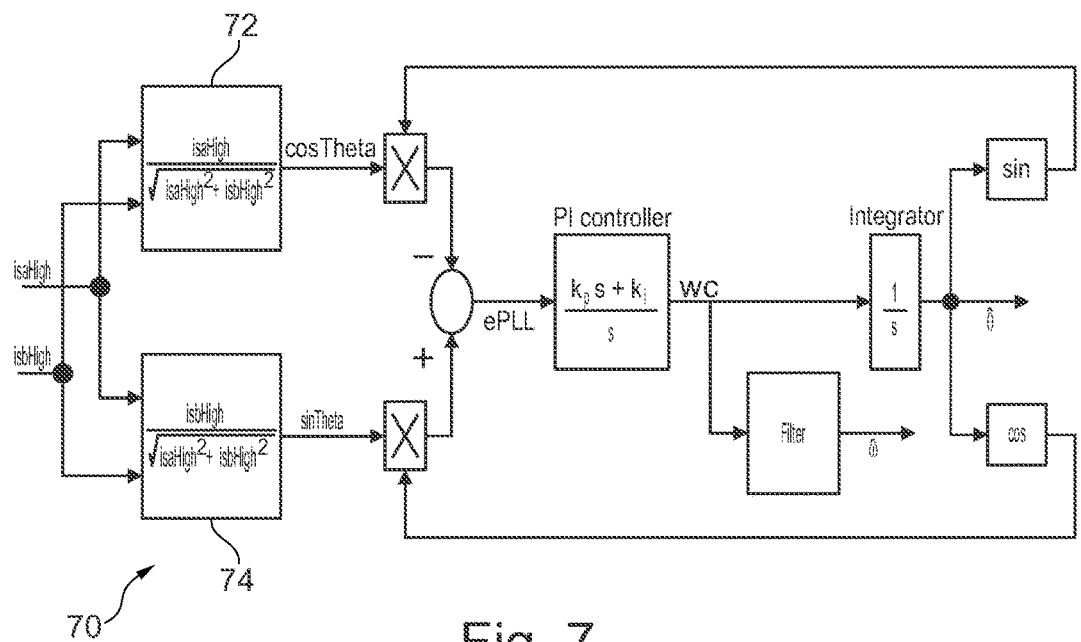
FIG. 7 shows a phase-locked-loop circuit in accordance with an aspect of the present invention.

The idea behind the PLL is that the sine of the difference between the actual input vector angle $\theta$ and its estimate $\hat{\theta}$ can be reduced to zero using a proportional-integral (PI) controller, thus locking the detected phase to the actual angle. The estimated frequency $\hat{\omega}$ is then integrated to obtain the angle $\hat{\theta}$. FIG. 7 shows the block diagram of a phase locked loop (PLL), indicated generally by the reference numeral 70, that may be used in the present invention.

As described above, the signals 50 shown in FIG. 5 are 3-phase current signals that represent the envelopes of the current signals detected in the shorted windings step 24 of the algorithm 20. The three-phase current signals 50 are converted into 2-phase signals $i_{saHigh}$ and $i_{sbHigh}$ using a Clarke's transformation. Thus, the signals $i_{saHigh}$ and $i_{sbHigh}$ that are used in the PLL 70 are the Clarke's transform of the peak currents of the sawtooth waveform.

In normal operation, the currents vectors $i_{saHigh}$ and $i_{sbHigh}$ are at right-angles to one another. The angle generated by joining the ends of the currents vectors together defines the vector angle signal θ. By simple mathematics, the cosine and sine of the vector angle θ are given by:

$$\cos(\theta) = \frac{i_{saHigh}}{\sqrt{i_{saHigh}^2 + i_{sbHigh}^2}}$$

and $$\sin(\theta) = \frac{i_{sbHigh}}{\sqrt{i_{saHigh}^2 + i_{sbHigh}^2}}$$

In the phase locked loop circuit 70, a first function block 72 converts the current vectors $i_{saHigh}$ and $i_{sbHigh}$ into an estimate of $\cos(\theta)$ using the formula:

$$\cos(\theta) = \frac{i_{saHigh}}{\sqrt{i_{saHigh}^2 + i_{sbHigh}^2}}$$

Similarly, a second function block 74 converts the current vectors $i_{saHigh}$ and $i_{sbHigh}$ into an estimate of $\sin(\theta)$ using the formula:

$$\sin(\theta) = \frac{i_{sbHigh}}{\sqrt{i_{saHigh}^2 + i_{sbHigh}^2}}$$

The PLL 70 generates an estimate of the vector angle. That estimate is denoted by the symbol $\hat{\theta}$.

As shown in FIG. 7, the estimate of $\cos(\theta)$ is multiplied by the sine of the estimated vector angle to give: $\cos(\theta)\sin(\hat{\theta})$. Similarly, the estimate of $\sin(\theta)$ is multiplied by the cosine of the estimated vector angle to give: $\cos(\theta)\sin(\hat{\theta})$.

An error term is calculated as follows:

$$ePLL = \sin(\theta - \hat{\theta}) = \cos(\theta)\sin(\hat{\theta}) - \sin(\theta)\cos(\hat{\theta}) \quad (1)$$

A PI controller is used such that the error term (ePLL) is forced to zero. In this way, signals for estimated frequency $\hat{\omega}$ and estimated vector angle signal $\hat{\theta}$ are obtained as outputs of the PLL 70.

Returning to the algorithm 20 of FIG. 3, as described above, the shorted windings estimation step 24 is used to give an estimated frequency, $\hat{\omega}$. The algorithm 20 then moves to step 26, where an orthogonality test is used to determine whether the estimations made in step 24 are likely to be reliable. The orthogonality test step 26 determines whether the signals $i_{saHigh}$ and $i_{sbHigh}$ are, in fact, orthogonal.

When the inputs of the PLL are extremely small and contain mostly noise (i.e. having a low Signal to Noise Ratio (SNR)), the $\cos(\theta)$ and $\sin(\theta)$ estimates will lose orthogonality. By checking for orthogonality of the $\cos(\theta)$ and $\sin(\theta)$ signals it is possible to determine whether the PLL estimation is valid or not. This is important because $\cos(\theta)$ and $\sin(\theta)$ must be orthogonal for the PLL to work properly.

The dot product of two vectors is given by:

$$\overline{A} \cdot \overline{B} = |A||B|\cos(\vartheta) \quad (2)$$

Since the $\cos(\theta)$ and $\sin(\theta)$ signals swing between ±1, the equation (2). can be reduced to:

$$\overline{A} \cdot \overline{B} = \cos(\vartheta) \quad (3)$$

If $\cos(\theta)$ and $\sin(\theta)$ are orthogonal the angle between them is 90 degrees ($\cos(90) = 0$) which means that when $\cos(\theta)$ and $\sin(\theta)$ are not corrupted:

$$\overline{A} \cdot \overline{B} = 0 \quad (4)$$

Note this would have been true even if the magnitudes were not equal to 1.

The dot product can be found iteratively by:

$$\overline{A} \cdot \overline{B} = \sum_{i=1}^{n} A_i B_i \quad (5)$$

Thus, in step 26, the PLL uses the stationary reference frame currents ($i_{saHigh}$ and $i_{sbHigh}$) which should be orthogonal to each other and uses a dot product as an orthogonality test to determine whether to trust the output of the PLL (determined when the dot product is below a determined threshold i.e. close to zero). If the reference frame currents are orthogonal, the algorithm 20 moves to step 34 described further below; otherwise, the algorithm moves to step 28.

At step 28 of the algorithm 20, it has been determined that the shorted winding estimation has not provided a reliable estimation of the rotor position. This is likely to be because the level of magnetisation in the motor winding is insufficient for the short-circuit steps to provide reliable data. Accordingly, at step 28, a magnetization pulse is applied to the motor.

Figure 8:
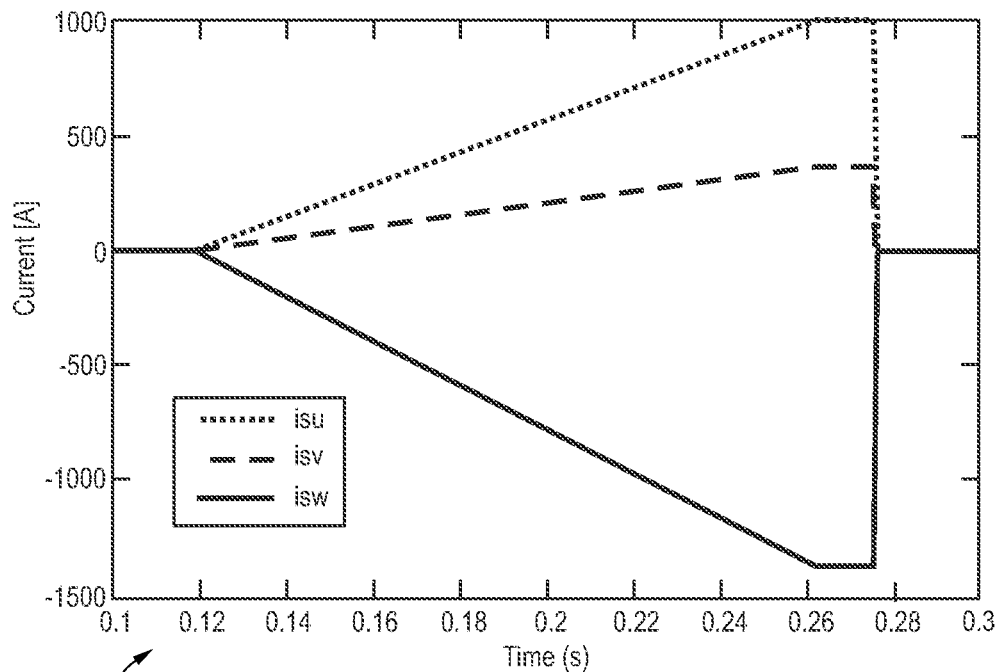
FIG. 8 shows magnetization pulses in accordance with an aspect of the present invention.

FIG. 8 shows a magnetization pulse, indicated generally by the reference numeral 80, in accordance with an aspect of the present invention. The magnetization pulse 80 injects a ramping three-phase current into the machine at a predetermined rate until the rated current of the machine is reached. A current regulator is used to create the current ramp. The current regulator requires a ramp rate and a target current value as inputs and outputs the three phase current ramp, such as that shown in FIG. 8.

When a current ramp is applied to a rotating induction machine the back emf (bemf) signal has two components:

A ramp

A sinusoid signal rotating at the frequency of the machine.

If the ramp is stopped before the ramp signal dominates the sinusoid signal, it is possible to get a minima of the bemf. Catching a minima of the bemf means that the current signal seen during the short winding estimation will be too low to get any useful information.

Once the magnetization pulse is applied, the step 28 is complete. The algorithm 20 then moves to step 30.

Step 30 is a second "shorted windings estimation" step and repeats the step 24 described above. Following, the application of the magnetizing pulse in step 28, the shorting process should result in correct measurements of rotor position.

From step 30, the algorithm 20 moves to step 32, where the orthogonality test (as described above with reference to step 26) is repeated. If the dot product is below the relevant threshold (i.e. near zero), the algorithm 20 moves to step 34. If the dot product is still not below the relevant threshold, it is assumed that the motor is at (or very close to) standstill and the algorithm 20 moves to step 36.

Step 34 of the algorithm 20 occurs when it has been determined that rotor position estimations are reliable (either in step 26 or step 32 of the algorithm 20). At this stage, the frequency of rotation of each phase of the motor has been deemed to have a reliable accuracy. To ensure that the magnetism level of the motor is at a suitable level (i.e. at a level such that the torque required to accelerate or decelerate the motor is available), the step 34 increases the flux in the machine to the appropriate level. When the flux is at the appropriate level, the algorithm 20 moves to step 36.

Figure 9:
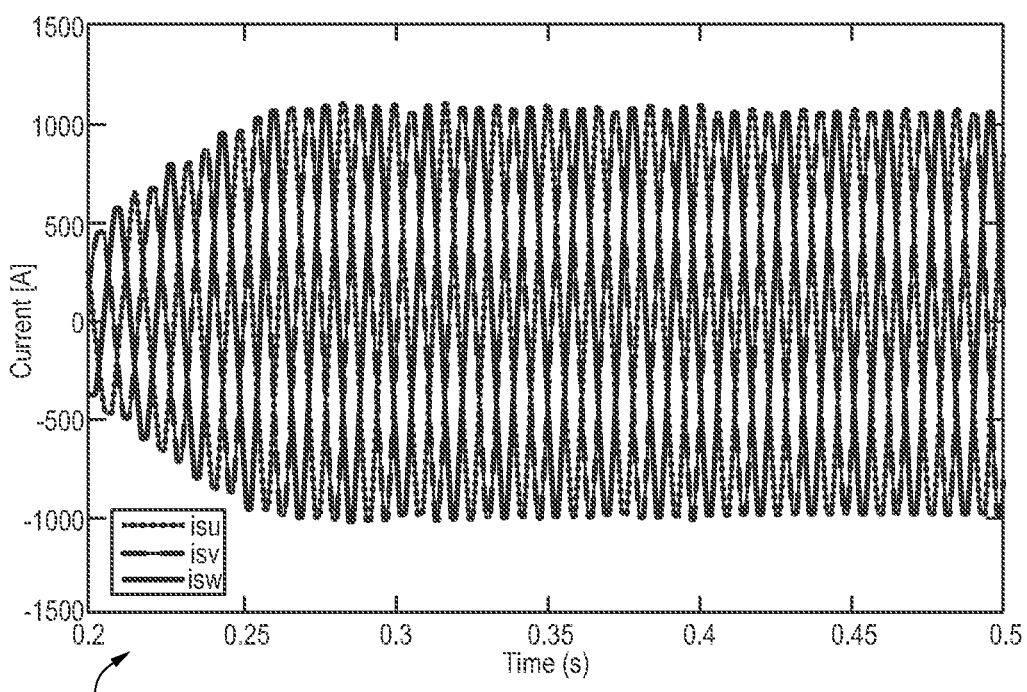
FIG. 9 shows magnetization ramp signals in accordance with an aspect of the present invention.

The step 34 is a "ramp magnetization level" step. The step 34 injects three-phase current into the motor 6 until the machine is fully magnetized. FIG. 9 shows an exemplary magnetization ramp signals, indicated generally by the reference numeral 90.

Since the speed of rotation of the motor has been determined, the phase currents applied in step 34 should match the already spinning motor. If this occurs, the motor is said to be "caught". It should be noted that if the estimation of the speed of rotation of the motor is incorrect by a small amount, then the increasing currents applied during the ramp step 34 will force the motor to follow the applied currents. Thus, despite small estimation errors, the motor is still "caught". This is possible if the error is sufficiently small and has been found to work well in practice.

At step 36 of the algorithm 20, either the motor has be "caught" at step 24 or step 28, or it is determined that the motor is at standstill (at step 32). In any event, the motor velocity is known and so normal control can commence. The algorithm 36 can therefore exit and normal motor control applied.

Figure 10:
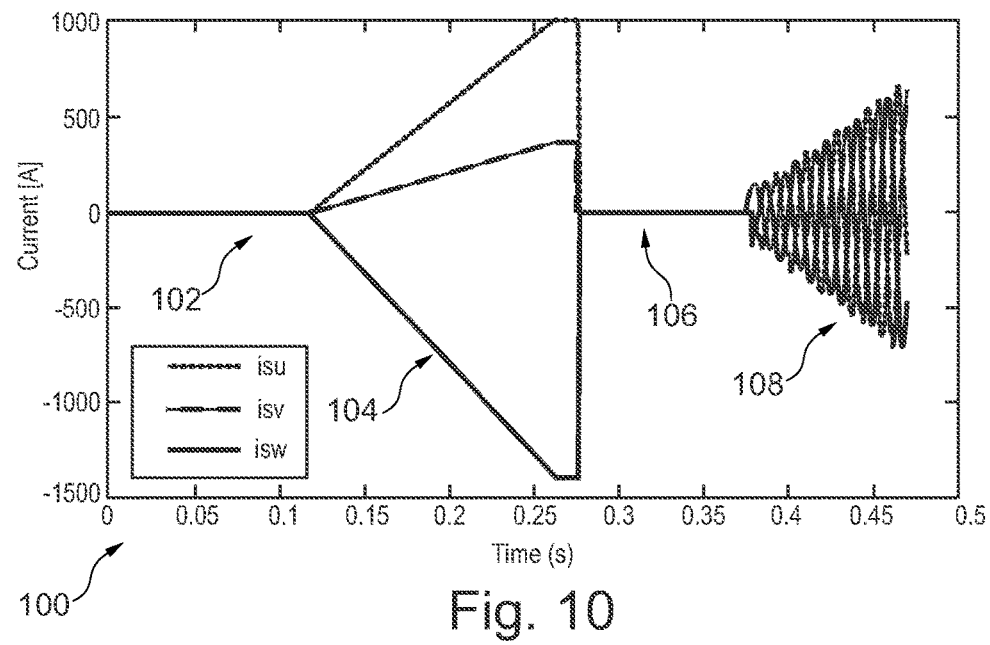
FIG. 10 shows signals of a motor starting arrangement in accordance with an aspect of the present invention.

FIG. 10 shows signals, indicated generally by the reference numeral 100, of a motor starting arrangement in accordance with an aspect of the present invention, thereby demonstrating an application of the algorithm 20. In the example of FIG. 10, the motor 6 being started is initially demagnetized.

The algorithm 20 starts within the initialisation step 22 followed by the shorted winding estimation step 24. The signals at this part of the algorithm are indicated generally by the reference numeral 102. Since the motor 6 is demagnetized, the short-circuit pulses applied in step 24 of the algorithm 20 do not result is current signal being generated. Accordingly, the portion 102 of the signals 100 do not show any current pulses.

Since the short circuit pulses at step 24 do not lead to currents being generated, the orthogonal test (step 26) fails and the algorithm moves to step 28 where a magnetizing pulse is applied (step 28). The magnetizing pulses are clearly visible at part 104 of the signals 100.

With the magnetizing pulse applied, the algorithm 20 moves to step 30 where short circuit pulses are again applied—this is shown at part 106 of the signals 100. Although it appears that no current is generated in response to the short-circuiting of the windings, in fact currents are generated, but they are too small to be visible in FIG. 10.

Following the step 30, the orthogonality of the current pulses is checked (step 32). This should now return a positive result, so that the algorithm 20 moves to step 34. At step 34, the magnetization level is ramped up, as shown in part 108 of the signals 100.

Figure 11:
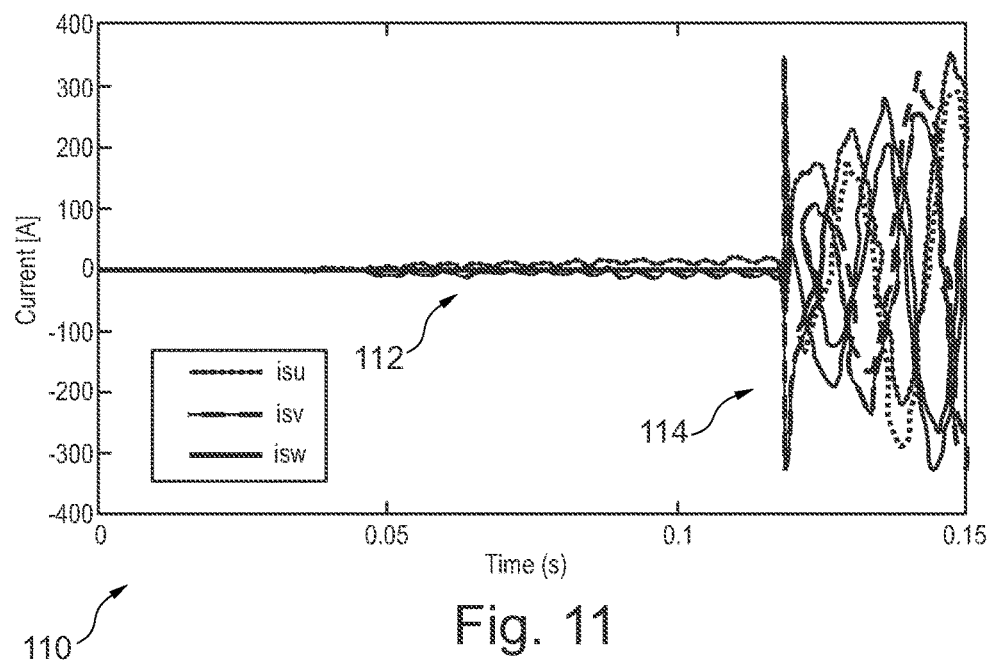
FIG. 11 shows signals of a motor starting arrangement in accordance with a further aspect of the present invention.

FIG. 11 shows signals, indicated generally by the reference numeral 110, of a motor starting arrangement in accordance with a further aspect of the present invention, thereby demonstrating a further application of the algorithm 20. In the example of FIG. 10, the motor 6 being started is initially magnetized.

The algorithm 20 starts within the initialisation step 22 followed by the shorted winding estimation step 24. The signals at this part of the algorithm are indicated generally by the reference numeral 112. Since the motor 6 is magnetized, the short-circuit pulses applied in step 24 of the algorithm 20 result is current signals being generated. Accordingly, the part 112 shows small current pulses.

Since short-circuit current pulses are generated from the magnetized motor, the orthogonal test (step 26) indicates that the current pulses are orthogonal and so the algorithm 20 moves to step 34. At step 34, the magnetisation level is ramped up, as shown in part 114 of the signals 100.

Figure 12:
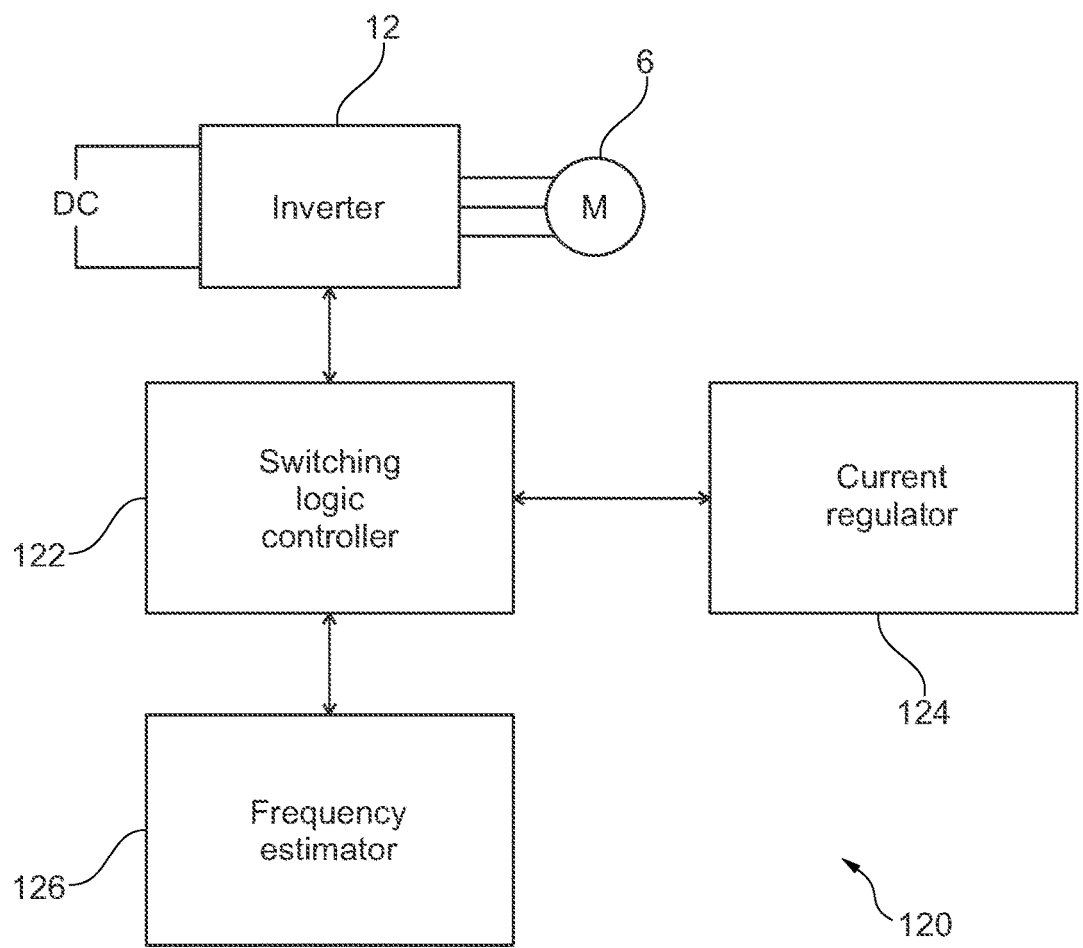
FIG. 12 shows a block diagram of a system in accordance with an aspect of the present invention.

FIG. 12 shows a block diagram of a system, indicated generally by the reference numeral 120, in accordance with an aspect of the present invention.

The system 120 comprises an inverter 12 and a multi-phase motor 6 as described above with reference to FIG. 1. The inverter has a DC input. The DC input may, of course, be obtained from an AC supply using a rectifier in the manner described with reference to FIG. 1.

The inverter 12 in the system 120 is controlled using a switching logic controller 122. The switching logic controller 122 provides PWM signals for the inverter switches and may obtain control information (such as voltages and/or currents) from the inverter 12. The switching logic controller 122 is in two-way communication with a frequency estimator 126 and a current regulator 124. The frequency estimator 126 may provide the functionality of the PLL 70 described above. The current regulator 124 may provide the control signals required to enable the inverter 12 to generate the magnetization signals described above with reference to FIGS. 8 and/or 9.

The system 120 is highly schematic. Clearly, many variants are possible.

The embodiments of the invention described above are provided by way of example only. The skilled person will be aware of many modifications, changes and substitutions that could be made without departing from the scope of the present invention. The claims of the present invention are intended to cover all such modifications, changes and substitutions as fall within the spirit and scope of the invention.

What is claimed is:

1. A method comprising:
   estimating a frequency of rotation of a motor by repeatedly short-circuiting at least some windings of the motor in order to generate a plurality of short circuit current pulses, identifying the peaks of the short circuit current pulses and using the identified peaks to estimate said frequency of rotation;
   determining whether the estimation of the frequency of rotation of the motor is reliable; and
   in the event that the estimation of the frequency of rotation of the motor is determined to be unreliable, applying a magnetising pulse to the motor and repeating the steps of estimating the frequency of rotation of the motor and determining whether the estimation of the frequency of rotation of the motor is reliable.

2. The method as claimed in claim 1, wherein determining whether the estimation of the frequency of rotation of the motor is reliable comprises determining whether signals indicative of cosine and sine vectors of measured currents are orthogonal.

3. The method as claimed in claim 2, further comprising determining whether the signals indicative of the cosine and sine vectors are orthogonal by determining whether a dot product of the cosine and sine vectors is below a threshold.

4. The method as claimed in claim 3, further comprising determining that the motor is at standstill in the event that repeating the step of determining whether the estimation of the frequency of rotation of the motor is reliable results in a determination that the frequency of rotation of the motor estimate is still unreliable.

5. The method as claimed in claim 3, wherein applying a magnetising pulse to the motor comprises injecting a ramping multi-phase current into the motor.

6. The method as claimed in claim 3, wherein, if the estimation of the frequency of rotation of the motor is determined to be reliable, increasing the magnetizing level within the motor.

7. The method as claimed in claim 2, further comprising determining that the motor is at standstill in the event that repeating the step of determining whether the estimation of the frequency of rotation of the motor is reliable results in a determination that the frequency of rotation of the motor estimate is still unreliable.

8. The method as claimed in claim 2, wherein applying a magnetising pulse to the motor comprises injecting a ramping multi-phase current into the motor.

9. The method as claimed in claim 2, wherein, if the estimation of the frequency of rotation of the motor is determined to be reliable, increasing the magnetizing level within the motor.

10. The method as claimed in claim 1, further comprising determining that the motor is at standstill in the event that repeating the step of determining whether the estimation of the frequency of rotation of the motor is reliable results in a determination that the frequency of rotation of the motor estimate is still unreliable.

11. The method as claimed in claim 10, wherein applying a magnetising pulse to the motor comprises injecting a ramping multi-phase current into the motor.

12. The method as claimed in claim 10, wherein, if the estimation of the frequency of rotation of the motor is determined to be reliable, increasing the magnetizing level within the motor.

13. The method as claimed in claim 1, wherein applying a magnetising pulse to the motor comprises injecting a ramping multi-phase current into the motor.

14. The method as claimed in claim 1, wherein, if the estimation of the frequency of rotation of the motor is determined to be reliable, increasing the magnetizing level within the motor.

15. The method as claimed in claim 14, wherein increasing the magnetizing level within the motor comprises injecting a multi-phase current into the motor.

16. A controller comprising:
   a first input for receiving a plurality of short-circuit current pulses from at least some windings of the a motor;
   a control module configured to identify peaks of the short circuit current pulses and using the identified peaks to estimate said frequency of rotation of the motor, the control module further configured to:
   determine whether the estimation of the frequency of rotation of the motor is reliable; and
   in the event that the estimation of the frequency of rotation of the motor is determined to be unreliable, to instruct the application of a magnetizing pulse to the motor and to repeat the steps of estimating the frequency of rotation of the motor and determining whether the estimation of the frequency of rotation of the motor is reliable.

17. The controller as claimed in claim 16, further comprising a frequency estimator configured to generate the estimate of the frequency of rotation of the motor.

18. The controller as claimed in claim 17, wherein the frequency estimator is further configured to determine whether signals indicative of cosine and sine vectors of measured currents are orthogonal.

19. The controller as claimed in claim 16, further comprising a current regulator to generate the magnetization pulse.

20. A motor drive circuit comprising a controller as claimed in claim 16 and further comprising an inverter under the control of said controller.

* * * * *